(12) United States Patent
Ikeda

(10) Patent No.: US 7,742,179 B2
(45) Date of Patent: Jun. 22, 2010

(54) DATA PROCESSING APPARATUS, POWER CONTROL METHOD, COMPUTER-READABLE STORAGE MEDIUM AND COMPUTER PROGRAM

(75) Inventor: Jun Ikeda, Ohta-ku (JP)

(73) Assignee: Canon Kabushiki Kaisha, Tokyo (JP)

( * ) Notice: Subject to any disclaimer, the term of this patent is extended or adjusted under 35 U.S.C. 154(b) by 1204 days.

(21) Appl. No.: 10/656,079

(22) Filed: Sep. 4, 2003

(65) Prior Publication Data

US 2004/0057069 A1    Mar. 25, 2004

(30) Foreign Application Priority Data

Sep. 6, 2002    (JP)    ............. 2002-261752

(51) Int. Cl.
G06K 15/00    (2006.01)
G06F 3/12    (2006.01)
G06F 1/00    (2006.01)

(52) U.S. Cl. .............. 358/1.14; 358/1.15; 358/1.13; 713/300; 713/320; 713/321; 713/323; 713/324; 713/340; 399/70; 399/88; 399/89; 709/202; 709/203; 709/223; 709/224; 709/225

(58) Field of Classification Search ............. 358/1.13, 358/1.14, 1.15; 709/202–203, 223–225; 713/300–340; 399/70, 88–89
See application file for complete search history.

(56) References Cited

U.S. PATENT DOCUMENTS

| | | | | |
|---|---|---|---|---|
| 5,784,628 A | * | 7/1998 | Reneris | 713/300 |
| 5,923,889 A | * | 7/1999 | Kim et al. | 713/323 |
| 6,172,762 B1 | * | 1/2001 | Uchiyama | 358/1.14 |
| 6,181,434 B1 | * | 1/2001 | Matsumoto | 358/1.13 |
| 6,389,544 B1 | * | 5/2002 | Katagiri | 713/300 |
| 6,442,699 B1 | * | 8/2002 | Nakajima | 713/320 |
| 6,641,312 B1 | * | 11/2003 | Chang et al. | 400/76 |
| 7,065,659 B2 | * | 6/2006 | Malueg et al. | 713/300 |
| 7,194,646 B1 | * | 3/2007 | Watts, Jr. | 713/322 |
| 7,200,651 B1 | * | 4/2007 | Niemi | 709/223 |
| 7,376,851 B2 | * | 5/2008 | Kim | 713/323 |
| 2001/0043353 A1 | * | 11/2001 | Iizuka et al. | 358/1.14 |
| 2002/0018227 A1 | * | 2/2002 | Asahi | 358/1.13 |
| 2002/0097423 A1 | * | 7/2002 | Qiao | 358/1.14 |
| 2002/0105671 A1 | * | 8/2002 | Sugahara | 358/1.15 |
| 2006/0238796 A1 | * | 10/2006 | Kadowaki | 358/1.14 |

FOREIGN PATENT DOCUMENTS

JP    2001-047692    2/2001

* cited by examiner

Primary Examiner—Twyler L Haskins
Assistant Examiner—Dennis Dicker
(74) Attorney, Agent, or Firm—Canon USA Inc IP Div

(57) ABSTRACT

An image data processing apparatus shifting to a power saving mode depending on whether a particular process is in progress on an image processing apparatus. A controller examines processes of host computers through a network, and controls a state of supplying power to blocks functioning for an image forming process, the blocks including a rasterizer, a memory, a printer engine, and a compressor/expander.

18 Claims, 11 Drawing Sheets

| | | | 703 | 704 | 705 | 706 |
|---|---|---|---|---|---|---|
| | 701 | 702 | PROCESS PSEUDO-SUSPENSION CONDITIONS | | | |
| | HOST NAME | PROCESS NAME | USER NAME | PROCESS LOAD THRESHOLD | PROCESS IDLE TIME | MODE SHIFT TIME OUT |
| CONDITION 1 | HOST A (host1. caxx. co. jp) | PROCESS X IN SUSPENSION | ikeda | 0.2 | 1.0h | 2.0h |
| CONDITION 2 | HOST B (host2. caxx. co. jp) | PROCESSES Q AND Y IN SUSPENSION | tanaka | 0.2 | 0.5h | 0.5h |
| 707 SHIFTING CONDITION | CONDITIONS FOR SHIFTING TO POWER SAVING MODE | PROCESS IN SUSPENSION STATE OR PSEUDO-SUSPENSION STATE IN ALL HOSTS | | | | |

PRINTER A

| | | PROCESS PSEUDO-SUSPENSION CONDITIONS | | | |
|---|---|---|---|---|---|
| HOST NAME | PROCESS NAME | USER NAME | PROCESS LOAD THRESHOLD | PROCESS IDLE TIME | MODE SHIFT TIME OUT |
| HOST C (host3. caxx. co. jp) | PROCESS Q IN SUSPENSION | ike | 0.3 | 2.0h | 1.0h |
| HOST D (host4. caxx. co. jp) | PROCESS X IN SUSPENSION | taka | 0.3 | 1.5h | 1.0h |
| HOST D (host5. caxx. co. jp) | PROCESS Y IN SUSPENSION | taka | 0.3 | 1.5h | 1.0h |
| CONDITIONS FOR SHIFTING TO POWER SAVING MODE | PROCESS IN SUSPENSION STATE OR PSEUDO-SUSPENSION STATE IN AT LEAST TWO HOSTS | | | | |

PRINTER B

FIG. 8A

PRINTER A

| | HOST NAME (701) | PROCESS NAME (702) | PROCESS PSEUDO-SUSPENSION CONDITIONS | | |
| --- | --- | --- | --- | --- | --- |
| | | | USER NAME (703) | PROCESS LOAD THRESHOLD (704) | PROCESS IDLE TIME (705) | MODE SHIFT TIME OUT (706) |
| CONDITION 1 | HOST A (host1.caxx.co.jp) | PROCESS X IN SUSPENSION | ikeda | 0.2 | 1.0h | 2.0h |
| CONDITION 2 | HOST B (host2.caxx.co.jp) | PROCESSES Q AND Y IN SUSPENSION | tanaka | 0.2 | 0.5h | 0.5h |
| 707 SHIFTING CONDITION | CONDITIONS FOR SHIFTING TO POWER SAVING MODE | PROCESS IN SUSPENSION STATE OR PSEUDO-SUSPENSION STATE IN ALL HOSTS | | | | |

PRINTER B

| HOST NAME | PROCESS NAME | PROCESS PSEUDO-SUSPENSION CONDITIONS | | | |
| --- | --- | --- | --- | --- | --- |
| | | USER NAME | PROCESS LOAD THRESHOLD | PROCESS IDLE TIME | MODE SHIFT TIME OUT |
| HOST C (host3.caxx.co.jp) | PROCESS Q IN SUSPENSION | ike | 0.3 | 2.0h | 1.0h |
| HOST D (host4.caxx.co.jp) | PROCESS X IN SUSPENSION | taka | 0.3 | 1.5h | 1.0h |
| HOST D (host5.caxx.co.jp) | PROCESS Y IN SUSPENSION | taka | 0.3 | 1.5h | 1.0h |
| CONDITIONS FOR SHIFTING TO POWER SAVING MODE | PROCESS IN SUSPENSION STATE OR PSEUDO-SUSPENSION STATE IN AT LEAST TWO HOSTS | | | | |

FIG. 8B

| | HOST SAMPLING INTERVAL |
| --- | --- |
| POWER SAVING ON | 5min (708) |
| POWER SAVING OFF | 1min (709) |

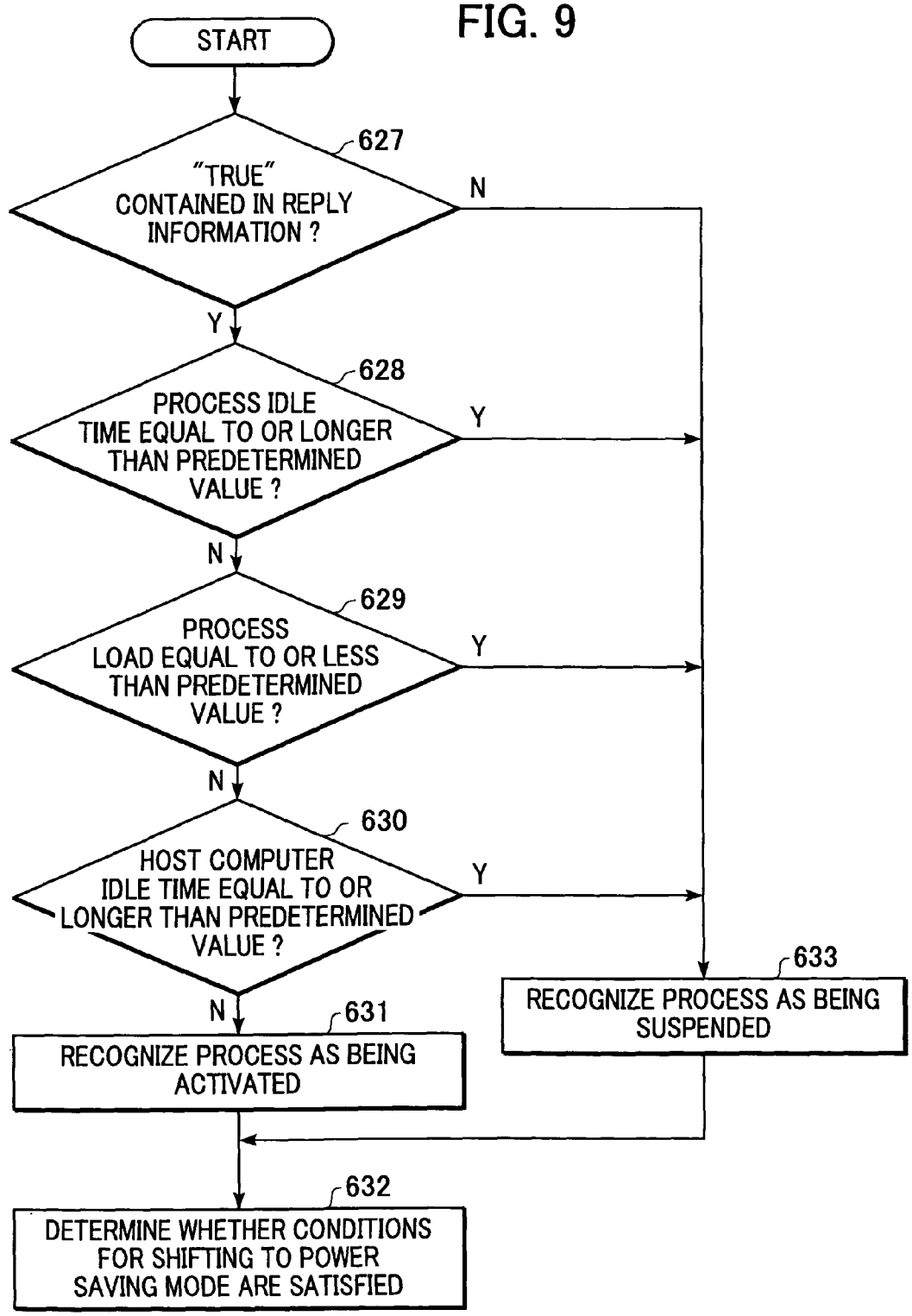

FIG. 11

STORAGE MEDIUM SUCH AS FD/CD-ROM

| DIRECTORY INFORMATION |
|---|
| FIRST DATA PROCESSING PROGRAM<br>GROUP OF PROGRAM CODES CORRESPONDING TO STEPS IN FLOW DIAGRAMS SHOWN IN FIGS. 6 AND 7 |
| SECOND DATA PROCESSING PROGRAM<br>GROUP OF PROGRAM CODES CORRESPONDING TO STEPS IN FLOW DIAGRAM SHOWN IN FIG. 9 |

MEMORY MAP OF STORAGE MEDIUM

DATA PROCESSING APPARATUS, POWER CONTROL METHOD, COMPUTER-READABLE STORAGE MEDIUM AND COMPUTER PROGRAM

BACKGROUND OF THE INVENTION

1. Field of the Invention

The present invention relates to a data processing apparatus communicating with an information processing apparatus through a network, a power control method, a computer-readable storage medium, and a computer program.

2. Description of the Related Art

A variety of conventional techniques are known to save power in image forming apparatuses such as laser beam printers. Furthermore, techniques for saving power using host computers in a network environment have been proposed.

Japanese Patent Laid-Open No. 2000-218894 discloses a power saving technique used in cooperation with a host computer. When a screen saver is activated in the host computer, for example, the host computer issues a sleep command to a printer or a sleep release command to power on the printer when an application software program is activated.

Japanese Patent Laid-Open No. 11-161449 discloses a technique in which a print server issues a power saving command when the printer server detects a logout of a workstation.

Conventionally, power control of devices using host computers in a network environment is not necessarily performed in an optimum fashion.

For example, power control of an image forming apparatus using a host computer cannot be performed when application software is left activated without actually being used.

Furthermore, when a plurality of personal computers and image forming apparatuses are connected to form a network, optimum power control is not performed using the plurality of personal computers, either individually or as a group.

SUMMARY OF THE INVENTION

It is an object of the present invention to provide a technique which examines information about processes that are either running on or are associated with a host computer and forms an optimum power saving environment based on the examination results by controlling power supply to each block for image forming in a data processing apparatus.

The present invention in one aspect relates to a power control method for a data processing apparatus including, a power source unit for supplying power required to form images, for communicating with an information processing apparatus through a network. The power control method includes the steps of examining a process of the information processing apparatus, and controlling the state of supplying power of the power source unit to each device based on the result of the process examination.

Further objects, features, and advantages of the present invention will be apparent from the following description of the preferred embodiments with reference to the attached drawings.

BRIEF DESCRIPTION OF THE DRAWINGS

FIGS. 8A and 8B illustrate management information in the data processing apparatus and/or information processing apparatus in accordance with preferred embodiments of the present invention.

FIG. 9 is a flow diagram illustrating a second data processing flow of the data processing apparatus in accordance with preferred embodiments of the present invention.

FIG. 11 illustrates a memory map of a storage medium storing a variety of data processing programs readable by the data processing apparatus of the preferred embodiments of the present invention.

DESCRIPTION OF THE PREFERRED EMBODIMENTS

First Embodiment

Figure 1:
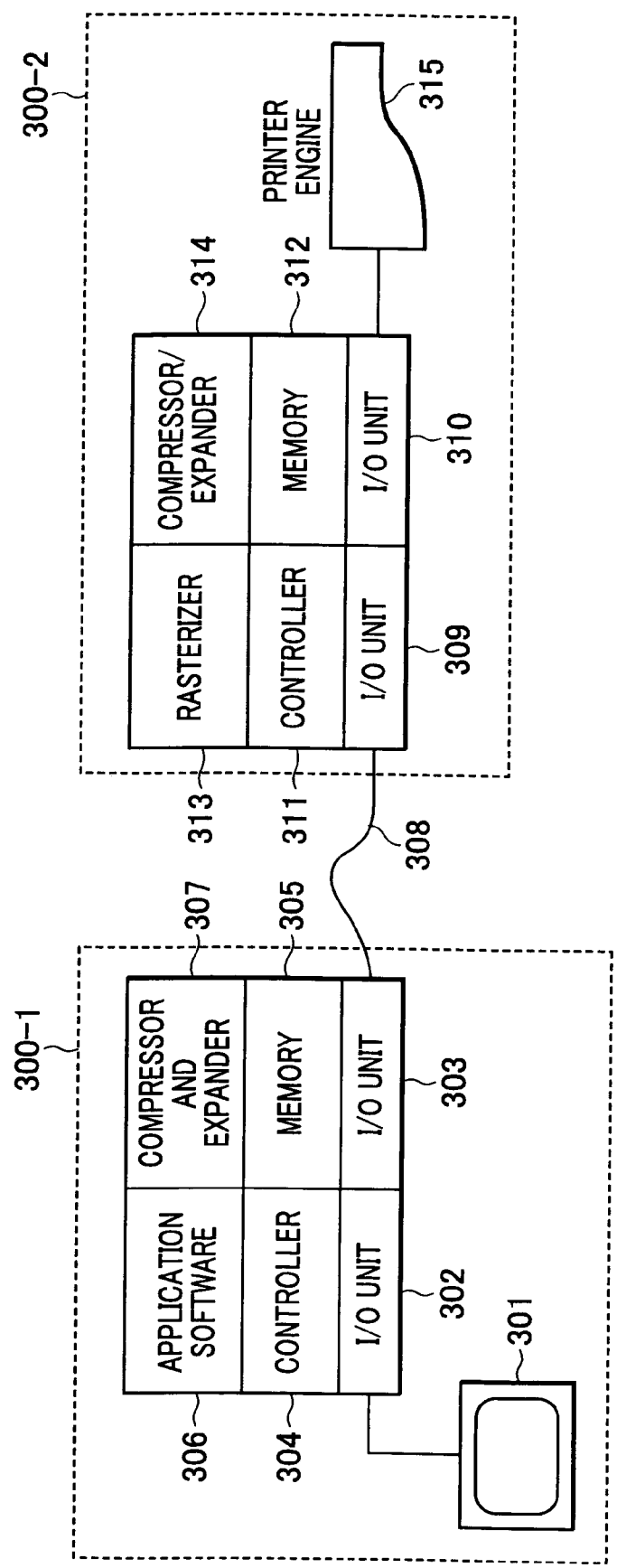
FIG. 1 illustrates a configuration of an image processing system incorporating a data processing apparatus in accordance with a first preferred embodiment of the present invention.
Figure 6:
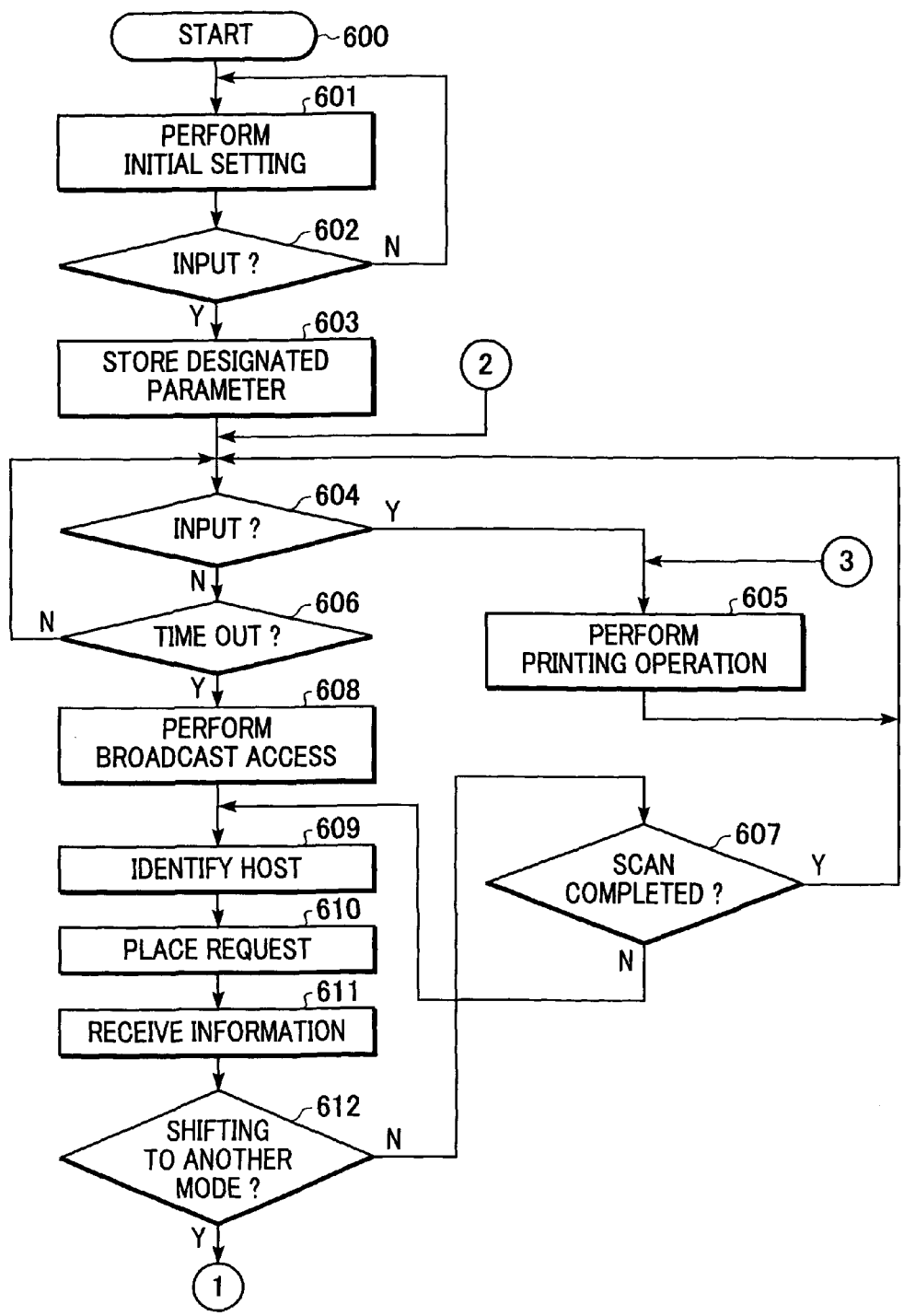
FIG. 6 is a flow diagram illustrating a first data processing flow of the data processing apparatus in accordance with preferred embodiments of the present invention.
Figure 7:
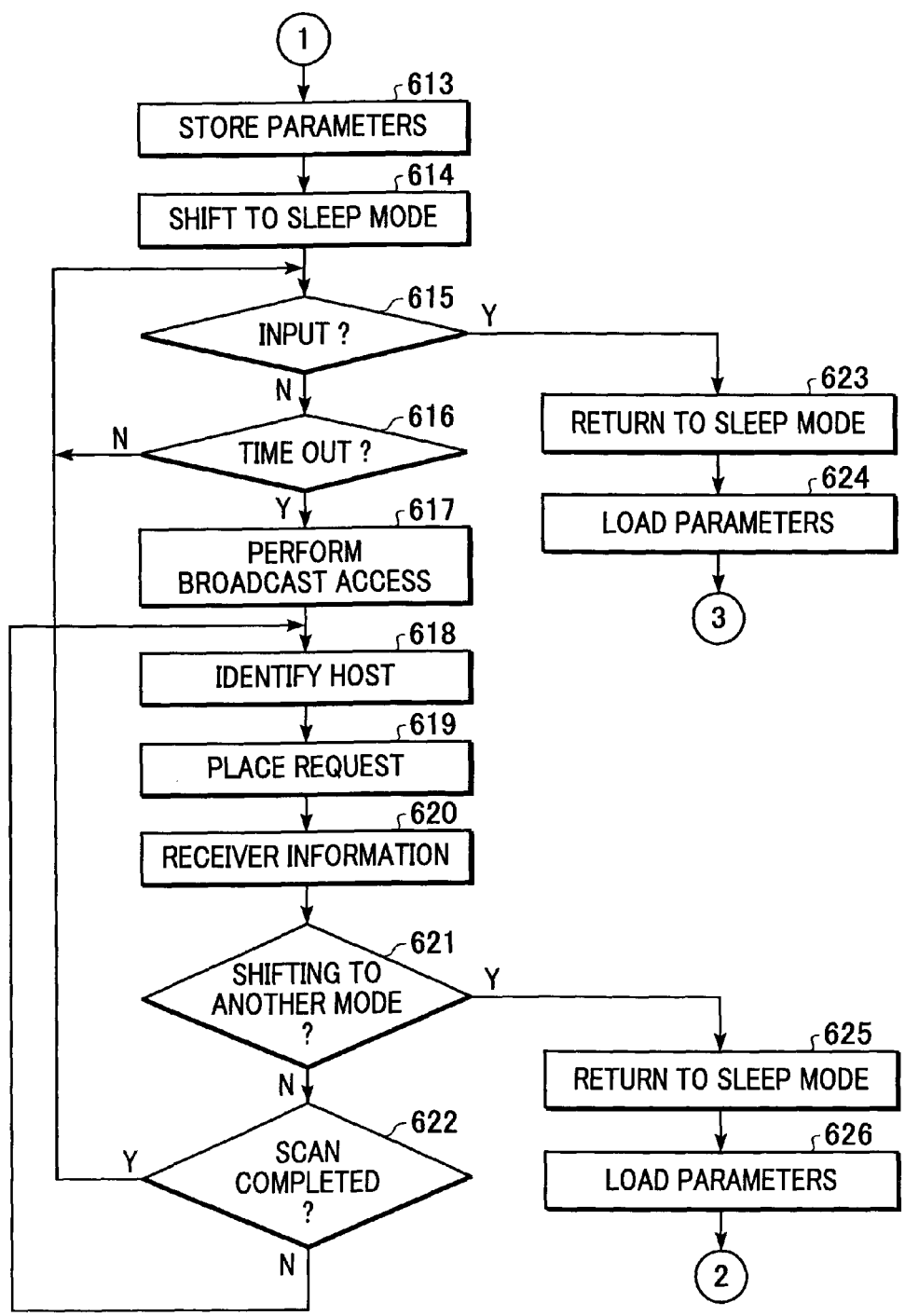
FIG. 7 is a continuation of the flow diagram shown in FIG. 6.

FIG. 1 illustrates a configuration of an image processing system incorporating a data processing apparatus in accordance with a first preferred embodiment of the present invention. A host computer 300-1 and a printer 300-2 communicating with each other under a network environment are shown in a simplified form. If a print server as an image processing apparatus is substituted for the printer 300-2, each step in flow diagrams illustrated in FIGS. 6, 7, and 9 is carried out by the information processing apparatus. The first and subsequent embodiments will be discussed in connection with the printer. The present invention is not limited to the printer. The image processing apparatus may be one of other apparatuses including a copying apparatus, a facsimile apparatus, and a digital integrated apparatus. The printer may be a laser beam printer of electrophotographic type, or an ink-jet printer, for example. The following discussion is assumed on the printer as the image processing apparatus.

As shown in FIG. 1, the host computer 300-1 includes a display 301 serving as a user interface. The user performs a series of jobs operating the display 301.

The host computer 300-1 also includes a display input/output unit 302, which is an interface compatible with hardware specifications of the display 301 and exchanges data with the display 301 in the host computer 300-1. If the display 301 is a CRT, an interlace scanning circuit of a refresh rate matching physical characteristics of the display 301, a video RAM, etc. are mounted on the display 301.

A network I/O unit 303 in the host computer 300-1 is a network interface such as an Ethernet (tradename) interface. The network I/O unit 303 implements a protocol stack such as TCP/IP required for the network, and MAC (Media Access Control), PHY (Physical Layer Protocol), and PMD (Physical Layer Medium Dependent) defined in IEEE Standards to support each layer. The protocol stack and communication hardware are not detailed here, and are collectively referred to as the network I/O unit 303.

A controller 304 refers to a CPU (Central Processing Unit) typically arranged on the host computer 300-1 and a job carried out by the CPU in cooperation with an OS (Operating System). The OS may be typically Windows or Unix.

All commands relating to the host computer 300-1 are carried out by the controller 304. The controller 304 includes a variety of elements, which are collectively referred to as the controller 304.

A memory 305 in the host computer 300-1 includes elements such as DRAM (Dynamic Random-Access Memory). The memory 305 represents all memory elements in the host computer 300-1 regardless of whether each memory element is volatile or non-volatile. The memory 305 thus includes a secondary storage device such as a disk device and battery-backed SRAM (static RAM), and EEPROM (electrically erasable programmable read-only memory).

Application software 306 running on the OS and the host computer 300-1 allows the user to generate data to be printed.

A compressor/expander 307 is intended to reduce the amount of data to be stored on a data storage area in the host computer 300-1 and a transmission time of data. In the first preferred embodiment, the compressor/expander 307 compresses print data desired by the user and generated by the application software 306 operated by the user when the print data is transmitted to a printer through a network. The compressor/expander 307 thus reduces data traffic and transmission time of the print data.

The present invention is not limited to any particular compression algorithm. The printer 300-2 uses a compression algorithm that expands the compressed data. Here, the JPEG (Joint Photographic Experts Group) compression is used.

The host computer 300-1 and the printer 300-2 exchange data through a network 308. The present invention is not limited to any particular protocol and physical characteristics. Here, TCP/IP is used on the 100 BASE-T connection. Although network repeaters and routers are frequently used in an actual network environment, whether or not such devices are used is not particularly specified here. Those devices are not shown in the drawings, either.

A network I/O unit 309, corresponding to the network I/O unit 303, is arranged in the printer 300-2. The printer 300-2 exchanges data with the host computer 300-1 through the network I/O unit 309. As the network I/O unit 303, the TCP/IP protocol stack and network hardware are implemented in the printer 300-2, although the present invention is not limited thereto.

A printer video I/O unit 310 functions as an interface with a printer engine 315 to be discussed later. The printer engine 315 is here a color LBP (Laser Beam Printer) engine, for example. Laser driving data to be used in electrophotographic process is transferred to the printer engine 315 through the printer video I/O unit 310.

A controller 311 generally controls the printer 300-2. More specifically, the controller 311 controls the network, each block in the printer 300-2, and operation of the display input/output unit 302. The controller 311 includes hardware such as a CPU, and software including an OS, and a variety of service programs.

A memory 312 is arranged in the printer 300-2. Using the memory 312, the controller 311 controls operations for printing, operations for network communications, and operations for the present invention.

The memory 312 includes but is not limited to a memory device such as a DRAM, a non-volatile memory such as EEPROM for storing settings input by the user in a non-volatile fashion, and a large-capacity secondary storage device such as a hard disk for storing fonts and macro programs for printing.

A rasterizer 313 is a hardware block that generates image data to be printed in the printer 300-2 using the printer engine 315. The image data may also be generated by software run by controller 311 in the printer 300-2. Although the hardware block is assumed to improve printing speed, the rasterizer 313 is shown as an independent block regardless of whether the rasterizer 313 is software or hardware.

A compressor/expander 314 expands data compressed by the compressor/expander 307 in the host computer 300-1. The compressed data transmitted from the host computer 300-1 is expanded to original data by the compressor/expander 314.

The printer engine 315 represents an optical system and a printing processing system. The printer engine 315 includes but is not limited to a color LBP. Raster scanned video data is input on a per YMCK electrophotographic color basis for laser driving, developed into a toner image on a photoconductive drum through a polygon mirror on a per process color basis, transferred to a recording medium such as a sheet, and then fixed to the recording medium. An image is thus printed in color.

Figure 2:
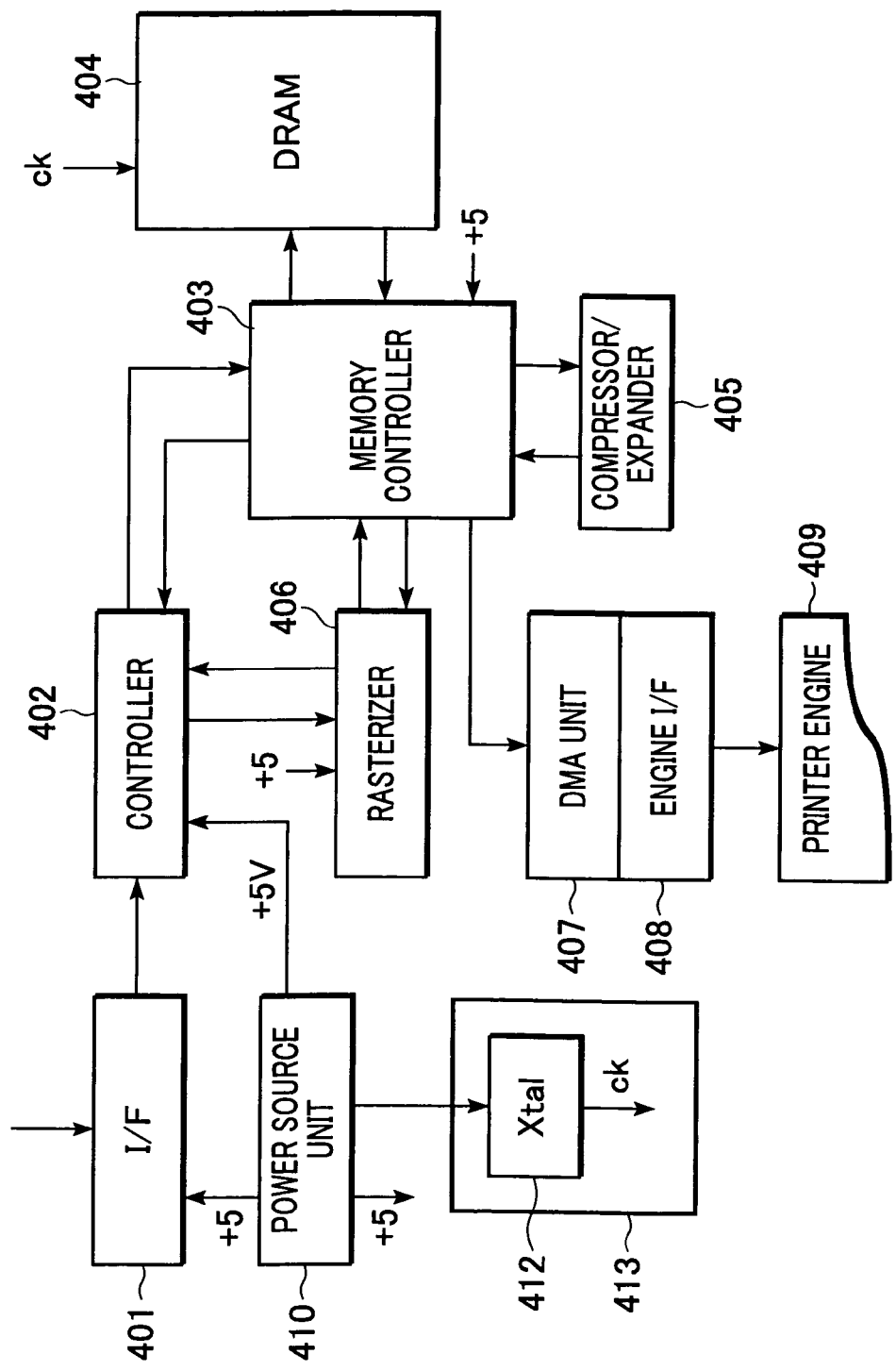
FIG. 2 is a block diagram illustrating the structure of the data processing apparatus of the first preferred embodiment of the present invention.

FIG. 2 is a block diagram illustrating the structure of the data processing apparatus of the first preferred embodiment of the present invention, corresponding to a printer controller (the controller 311, the network I/O unit 309, and the compressor/expander 314) of the printer 300-2 shown in FIG. L.

As shown, an interface (I/F) unit 401 receives data from a source of data such as the host computer 300-1, and exchanges status information. The interface unit 401 includes a parallel interface, a serial interface, a network interface, etc.

A controller 402 generally controls the printer and processes data. More specifically, the controller 402, including a CPU, analyzes an input rendering command, generates image data to be rendered, and controls each blocks in the printer 300-2.

A memory controller 403 controls a DRAM 404 as a main memory in the printer controller. More specifically, the memory controller 403 controls data access from a rasterizer 406, a compressor/expander 405, and a direct memory access (DMA) unit 407, and refreshes the DRAM 404.

The memory 404 includes but is not limited to a DRAM. The DRAM 404 stores image data, which is generated by the controller 402 in accordance with rendering command data from the host computer 300-1, data compressed by the compressor/expander 405, and rendering data (source data to be compressed) of the rasterizer 406. The DRAM 404 also serves as a working memory area.

The compressor/expander 405 compresses and expands image data. The compression and expansion algorithm of the compressor/expander 405 is not limited to any particular one. The compressor/expander 405 preferably compresses image data at a compression rate that reduces the amount of data occupying memory area during a compression operation while functioning at an operation speed fast enough to match a data transfer speed of the engine to be discussed later during an expansion operation of the compressed data. For example, the compression algorithm may be JPEG or JBIG (Joint Bilevel Image Experts Group).

The rasterizer 406 generates image data in response to a command from the controller 402. The rasterizer 406 also generates image data from an intermediate language, which is primitive with respect to an image generated by the controller 402 and temporarily stored in the DRAM 404, at a high speed using hardware or software.

When the printer controller prints image, the DMA unit 407 sends, to a printer engine 409, image data which is generated and stored in the DRAM 404 by one of the rasterizer 406 and the compressor/expander 405. The DMA unit 407 is controlled in various settings by the controller 402.

An engine I/F 408 sends the image data output from the DMA unit 407 to the printer engine 409. The engine interface 408 is also controlled in various settings by the controller 402.

The printer engine 409 fixes the image data output from the engine I/F 408 onto a medium such as a sheet in printing. The printer engine 409 may be a page printer engine such as an LBP.

When its power switch (not shown) is turned on, the power source unit 410 supplies blocks in the printer with voltages at appropriate control levels thereof. The present invention is not limited to any particular power supply method as long as power saving is achieved. Although it is not specifically shown in FIG. 2, the power source system is not a single system for supplying power to the blocks. A more effective power saving may be achieved by supplying power to blocks in need of power on a block by block basis to resume a sleep mode and then to quit the sleep mode.

A crystal oscillator 412 is controlled by a clock controller 413 in an oscillation operation. The crystal oscillator 412 supplies blocks with a clock having a frequency required for access control in the DRAM 404, and a clock having a frequency required by the blocks in the printer 300-2. The crystal oscillator 412 outputs a gated clock to save power in the sleep mode, for example. The crystal oscillator 412 may supply the blocks in the printer with the clocks on a per block basis to achieve the sleep mode for power saving.

During a power saving mode (the sleep mode) in the first preferred embodiment of the present invention, power supply from the power source unit 410 is limited to the interface unit 401 and other blocks if the other blocks (although not shown) contain a portion required for a series of jobs. In response to a data input to the interface unit 401, the controller 402 is interrupted to quit the sleep mode. The shifting conditions to the sleep mode will be described in detail with reference to flow diagrams illustrated in FIGS. 8 and 9.

Figure 3:
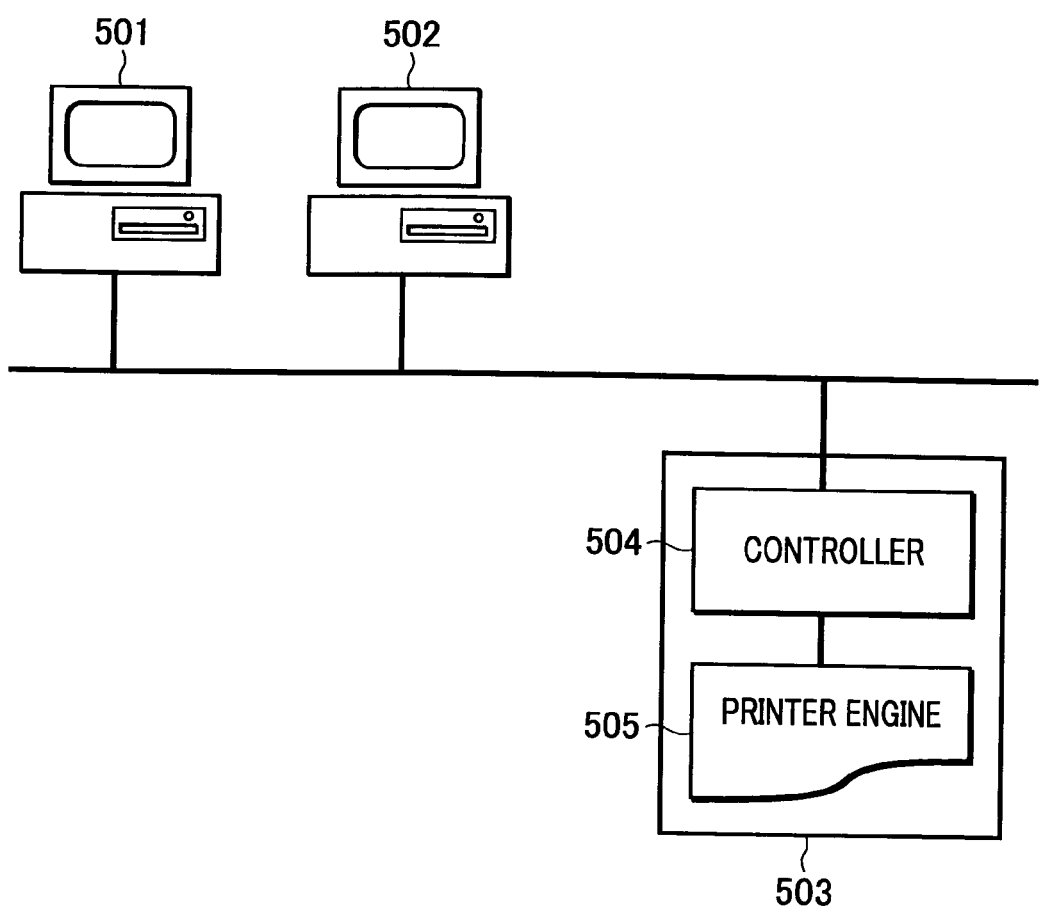
FIG. 3 illustrates an access route between a host computer and the data processing apparatus of preferred embodiments of the present invention.
Figure 4:
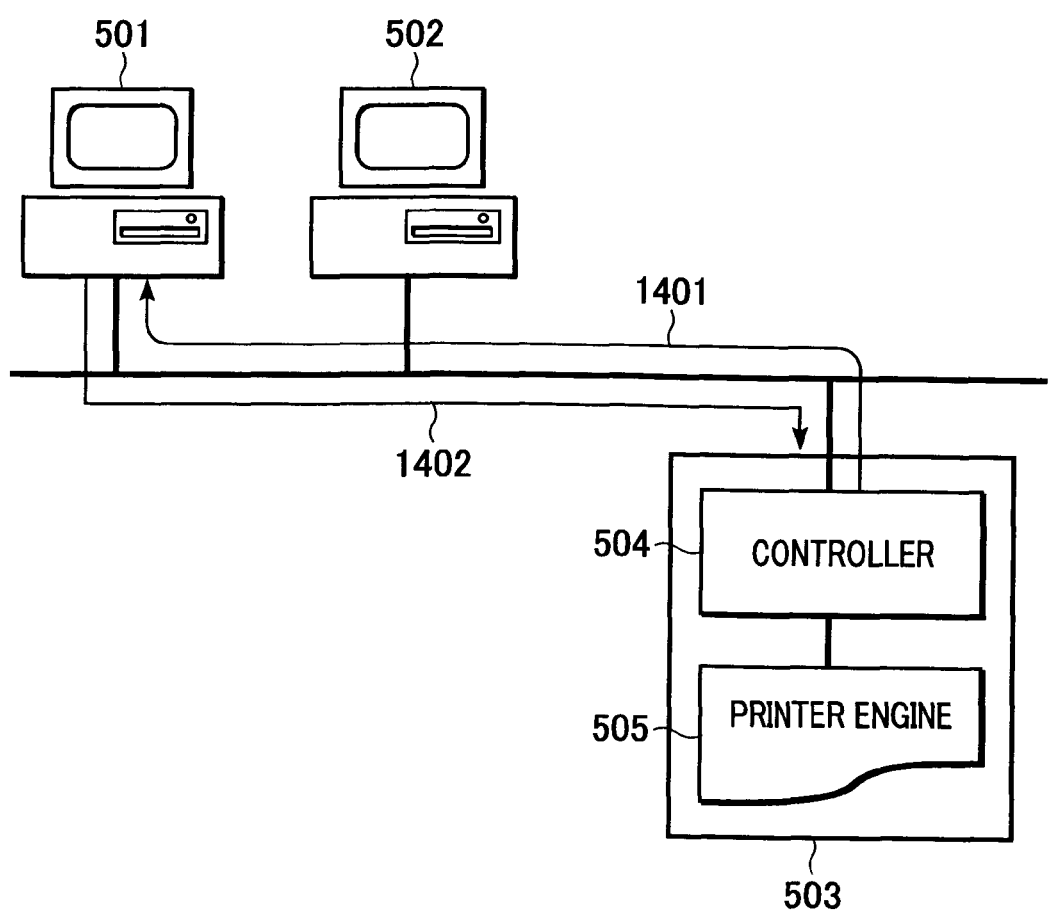
FIG. 4 illustrates an access route between a host computer and the data processing apparatus of preferred embodiments of the present invention.
Figure 5:
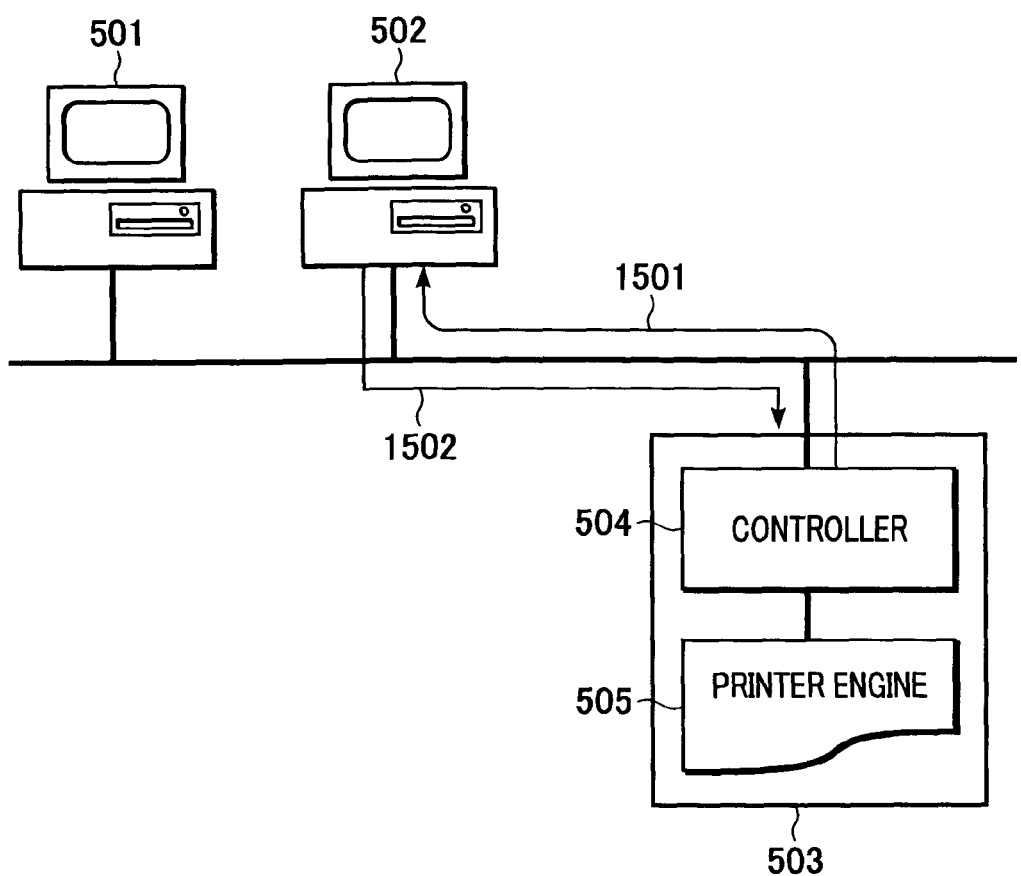
FIG. 5 illustrates an access route between a host computer and the data processing apparatus of preferred embodiments of the present invention.

FIGS. 3 through 5 illustrates access routes between host computers 501 and 502 and a printer 503 as a data processing apparatus of preferred embodiments of the present invention.

A system illustrated in FIGS. 3 through 5 includes the host computers 501 and 502, and the printer 503 connected to the host computers 501 and 502 through a network. A simplified system includes two host computers 501 and 502 and the printer 503 used by the host computers 501 and 502. The printer 503, connected to the network, includes a controller 504 and a printer engine 505.

Many other host computers and printers may be further connected to the network. There may be also routers, repeaters, and gateways included in the system configuration. Even if more apparatuses and network paths are present, the present invention may be implemented in each of all apparatuses in the system by performing the following process. The operation of the system will be described referring to a minimum number of apparatuses.

FIGS. 6 and 7 are flow diagrams illustrating a data processing procedure in the data processing apparatuses of preferred embodiments of the present invention. Steps are denoted by numbers 600 through 626.

The user switches on the printer 503 (step 600). The controller 311 illustrated in FIG. 1 recognizes conditions, entered beforehand by the user, for shifting to a power saving mode, and performs initial setting (step 601). Conditions for shifting to the power saving mode are stored in a non-volatile memory device in the memory 312, and FIGS. 8A and 8B illustrate the content of the non-volatile memory device. A variety of parameters set beforehand by the user prior to the switch-on are stored in the non-volatile memory device in the memory 312. The controller 311 retrieves the data of the parameter from the memory 312 subsequent to the switch-on.

The controller 311 determines in step 602 whether the settings, namely, the conditions for shifting to the power saving mode (input) are recognized. If the controller 311 determines that the conditions are recognized, the algorithm proceeds to step 603; otherwise, the algorithm loops to step 601.

The controller 311 stores the recognized settings as parameters for use in the operation of the printer in a working area in the memory 312.

Steps 601-603 are simplified because the present invention is not limited to any particular method of setting parameters. Parameters may be received from a server (not shown) through the network. Alternatively, default parameter values are set at the booting of the printer, and if required, the user may modify and input the default values using a user interface (such as a control panel) in the printer.

If there is no input in step 602, the algorithm loops to step 601. Steps 601 and 602 look like forming an endless loop, because the user typically inputs settings on the panel at the startup of the printer. If no particular input is entered, the data stored in the non-volatile memory area may be retrieved to the working area.

The printer remains on standby waiting for print data input from the host (step 604) by monitoring reception of print data from the host computer or print server and monitoring print request data.

In addition to the above process, the controller 311 shown in FIG. 1 initializes controller blocks of the network I/O unit 309, the printer video I/O unit 310, the memory 312, the compressor/expander 314, and the rasterizer 313, and performs initialization on the printer engine 315 by issuing an initialization command to the printer engine 315 through the already initialized printer video I/O unit 310. In this way, the controller 311 initializes the printer engine 315 for a printing process including calibration and initialization of a fixing unit. The entire printer is thus initialized. If printing data is input under this state, the printer is ready to print immediately.

If the controller 311 determines in step 604 that print image data is present, the algorithm proceeds to step 605; otherwise, the algorithm proceeds to step 606.

If the print image data is present, the controller 304 initializes blocks of the display input/output unit 302, the network I/O unit 303, the memory 305, and the compressor/expander 307 illustrated in FIG. 1. The user causes the application software 306 to run under the control of the controller 304. Print data is generated with the application software 306 running. The controller 304 designates a printer present over the network, and sends the data to that printer. The printing operation thus starts.

The present invention is not limited to any particular method of the application software 306 to send the data to the printer subsequent to the boot-up of the host computer. For example, the application software 306 is activated, a file is designated and opened in a disk in the host computer, and the application software 306 calls the operating system and hardware to allow the user to select a target printer. The user designates the printer, and issues a command to print the image data. Upon receiving the command, the application software 306 and the operating system compress output data to be transmitted over the network using the compressor/expander 307 and the memory 305 in the host computer to reduce data transmission time. The host computer then transmits the compressed data to the target printer through the network I/O unit 303. These series of steps are known and not directly related to the feature of the present invention.

If the controller 402 determines in step 604 that the input data is print data from the host computer, the printer performs a series of printing steps to print out the print data (step 605). The series of printing steps are known, and are not limited to any particular ones. For example, the printer performs the following process. The print data received by the interface unit 401 illustrated in FIG. 2 is stored in a reception buffer area mapped beforehand in the DRAM 404 under the control of the controller 402.

The operation of storing the data in the reception buffer area is organized as a task different from a task assigned to the processing of the stored data. The storage of the data in the buffer area is typically assisted by hardware in a high-speed interface such as the network.

The controller 402 transfers beforehand-received data to the reception buffer area in the DRAM 404 through the interface unit 401 in a DMA fashion. No DMA block is shown in FIG. 2.

When the received data is stored in the reception buffer area mapped in the DRAM 404, the controller 402 interprets the data, and operates the printer in accordance with the resulting interpretation.

More specifically, in a language system controlling a printer, such as a so-called page description language (PDL), the controller 402 extracts a PDL section only from received raw data stored in the reception buffer area using a protocol stack routine operating as a different task in the controller 402, interprets print command data, and then generates rasterized image data in a bit-map area mapped in the DRAM 404.

In the arrangement shown in FIG. 2, a rasterizing operation is assisted by hardware, namely, the rasterizer 406. More specifically, a render command issued from the controller 402 is interpreted by the rasterizer 406. In accordance with the command, bit image data is stored in the bit-map area in the DRAM 404.

The compressor/expander 405 expands the image data sent from the host computer if the image data is in a compressed state. The image data, after being expanded, is also stored in the DRAM 404.

The controller 402 sets, in the DMA unit 407, storage location information of the image storage area in the DRAM 404 that sends the image data to the printer engine 409, and activates the printer engine 409 and the DMA unit 407.

Upon being activated, the printer engine 409 feeds a print sheet while transferring a raster scan synchronization signal to the DMA unit 407 through the engine I/F 408. The DMA unit 407 sends the image data from the DRAM 404 to the printer engine 409 through the engine I/F 408 in synchronization with the synchronization signal.

The controller 402 places an access request to the DRAM 404 through the memory controller 403. The memory controller 403 interprets the access request, thereby generating a handshake timing signal that identifies a physical element in the DRAM 404.

The image data of one page is thus transferred to be printed. These steps are known. The rasterizing operation is performed using software, and since the printer engine 409 is a page printer such as an LBP, the printer engine 409 and the DMA unit 407 are activated subsequent to the rasterizing operation of one page. The apparatus is configured in a memory conservation design without the need for assuring the bit-map area of one page in the DRAM 404 if an access speed to the DRAM 404, a rasterizing speed of the rasterizer 406, and processing speeds of other blocks are tuned. More specifically, the printer engine 409 and the rasterizer 406 are activated after rasterizing a headband area of one page, rather than waiting until the completion of the rasterizing of the one page.

The printer engine 409 is not limited to the page printer such as the LBP. After these series of steps, the algorithm returns to step 604 from step 605.

If it is determined in step 604 that the input data is not print data, the controller 402 determines whether to place a query to the host computer (whether time out occurs) (step 606).

The time at which the printer starts status checking of the host computer, and the time elapsed from last one of print data designated by the printer and arrived from all host computers over the network are set as parameters of host sampling intervals. Here, the user sets 5 minutes from last arrived data as a parameter in steps before step 603, and the controller 402 recognizes the set parameter.

More specifically, the controller 402 determines whether 5 minutes have elapsed since last arrival of image data. If 5 minutes have not elapsed, the algorithm returns to step 604. The print data is then sampled. If the controller 402 determines that 5 minutes have elapsed, the algorithm proceeds to step 608. FIGS. 8A and 8B illustrate determination criteria stored in the memory, which is referenced during the determination.

If the printer determines in step 608 that no print data has arrived within the past 5 minutes, the printer makes a broadcast to acquire information, required to communicate with the host computer, such as an IP address and a host name to verify the host computer.

Alternatively, one or a plurality of host computers can be stored (registered) beforehand in the non-volatile memory area (in the memory 312) for access.

When the controller 402 shown in FIG. 2 determines that the threshold time and access conditions are satisfied, an access request is sent over the network 308 shown in FIG. 1 through the protocol stack in the interface unit 401 (the protocol stack may be arranged in the controller 402).

A broadcast packet sent in this way is received by each host computer. Each host computer returns status information to the sender, namely, the printer. The printer thus acquires status information of the devices over the network 308. If the sender is an information processing apparatus such as a print server, each host computer returns status information requested by the information processing apparatus. Such an operation will be discussed later in connection with a third preferred embodiment.

A command rup used in UNIX may be used in step 608. In response to the command rup, load average information or up information of each host computer may be acquired. Any host computer returning no reply may be considered to be turned off.

The controller 402 compares the received host computer status information with list information of target host computers set in the non-volatile memory area (in the memory 312) by the user (see 701 in FIG. 8A). In step 609, the controller 402 thus identifies the host computer to be accessed by determining whether the host computers identified by the host computer status information acquired in step 608 is found in the list information in 701 in a table in FIG. 8A. The printer thus identifies the host computer by determining a match in host names in step 609, for example.

If the host computer is identified in step 609, the printer sends a request to send information to the host computer in accordance with information 701 in FIG. 8A (step 610). The TCP/IP requires the IP address of the target host computer. If the DNS is supported, the printer checks the IP address of the target host computer in FIG. 8A against the IP address of the DNS server set beforehand, thereby acquiring the IP address of the host computer. The printer accesses the IP address of the host computer. Alternatively, the IP addresses of the host computers may be contained in the table shown in FIG. 8A, and a direct access is made to the IP address.

Such access is represented by access routes 1401 and 1402 in FIG. 4. The host computer identified in this way is a host computer 501. The printer described above is a printer 503.

The printer 503 requests at least information represented by items 701 through 706 shown in FIG. 8A.

More specifically, the printer 503 issues a request to acquire a host name and an IP address to acquire the information 701. For the information 703, the printer 503 issues a request to acquire a login name of the host computer. For the information 704 corresponding to the process name 702, the printer 503 issues a request to acquire information containing a combination of the process name and process load. For the information 705, the printer 503 issues a request to acquire information containing the process name and idle time. For the information 706, the printer 503 issues a request to acquire running time of a power saving mode in the host computer. The information items 701-706 may be acquired cumulatively at a time or individually. The processes here refer to a diversity of processes including a process of application in Netscape or a process organized in an OS and unique to the OS.

One example of a request in UNIX may be 'rsh A ps–Af| grep X' where a remote shell command functions. A permission (access privilege) to use a remote shell is granted beforehand. The printer then receives information of all processes operating on a host computer called "A". In the printer that receives the information, a filter for searching for a process called X is operated.

The printer thus receives information concerning a diversity of processes in the host computer required to determine the information 701 through 706 in FIG. 8A. The number of processes registered in the predetermined host computer is not limited to one. A plurality of processes may be registered. The printer places a request on the host computer for each of a plurality of application programs. The operation of the host computer is simplified if the printer has a function that collectively acquires information of a plurality of processes to be executed by the host computer, and that filters the information of the processes according to the setting information 702.

The printer 503 receives the reply data responsive to the request made in step 610 from the host computer 501 (step 611). The reply data is transferred through the access route 1402 shown in FIG. 4. If the request is a query such as "the application X is running on the host computer A?", the received data may be "yes" or "no" ("true" or "false"). In the rsh in the UNIX, the printer receives only results obtained through a filter which is activated in the host computer in accordance with "rsh A'ps–Af| X'. The printer 503 may be provided with a grep filter, and a process subsequent to piping may be performed by the printer 503. Any method may be used as long as the presence of the process having the name X is verified. The information items 701 through 706 in FIG. 8A sent from the host computer 501 is received by the printer 503 in response to the request placed in step 610, and is then used (referenced) in step 612 and step 629.

Based on the information received in step 611 and the determination criteria illustrated in FIG. 8A, a determination is made to shift to the power saving (step 612). For example, in the case of process Q on host C, and process X on host D, a determination is made to shift to power saving mode when processes Q and X are in suspension.

The information listed in tables shown in FIG. 8A is stored in memory in each printer, and provides determination criteria according to which a determination of whether the printer shifts to the power saving mode is made. The determination criteria includes the setting (shifting conditions 707) of statuses of a plurality of host computers (701) that causes the printer 503 to shift to the power saving mode, and the determination criteria (704-706) of a process that is considered to be in a pseudo-suspension state. If a single host computer is registered in the tables in FIG. 8A, optimum power control is performed on the printer 503 in a one host computer to one printer configuration.

A shifting condition 707 may be appropriately modified using an operational panel on the printer 503 or an input command from the host computer 501 connected to the printer 503 through the network. For example, in the shifting condition 707 shown in FIG. 8A, if the process load average of the plurality of host computers is equal to or lower than a predetermined value the printer 503 shifts to the power saving mode.

If the determination criteria in FIG. 8A determines that the mode shift is to be performed, the algorithm proceeds to step 613; otherwise, the algorithm proceeds to step 607, where the process status of each host computer (device) and standby status are examined.

In step 607, the status of each host computer (process status) registered in succession is examined. More specifically, the printer 503 determines whether another condition in addition to the condition 1 is registered. If the printer 503 determines that no further condition is registered, in other words, if a scan operation to the host computers is completed, the algorithm returns to step 604 to receive and sample print data. If it is determined that the scan operation is not yet completed, the algorithm returns to step 609 where a next scan operation is performed to a host computer of the next condition.

Condition 2 is set in addition to the condition 1 in the determination criteria shown in FIG. 8A. The algorithm proceeds to step 609 from step 607. The printer 503 identifies a host computer called B (step 609), and places the same requests as the ones already described. For example, in the same manner as in the request sent to the host computer A, the request for reply to querying whether process Y and/or process Q is running on the host computer B. The request is transferred along an access route 1501 shown in FIG. 5. The host computer B is shown as the host computer 502 as in FIG. 5.

The reply to the request in step 610 is received as "yes" or "no" ("true" or "false") in step 611. The reply information is transferred along an access route 1502 as shown in FIG. 5.

Criteria to perform mode shift is determined in step 612 based on the process information of the individual host computers and predetermined shifting conditions 707.

A mode shift is performed in FIG. 8A, if the printer A receives the reply "false" from the host computer A, and the reply "false" from the host computer B, or if the designated process of the two host computers A and B is in pseudo-suspension state that is considered equivalent to a suspension state.

In other words, if all conditions designated beforehand are satisfied, the mode shift is performed. A determination of whether or not to shift to another mode also takes into consideration whether a scan search pointer of setting conditions points to a final list of setting conditions.

Referring to a flow diagram illustrated in FIG. 9, a process of regarding a predetermined process in each host computer as being in a suspension state will now be discussed in detail.

FIG. 9 is the flow diagram of a second data processing algorithm of the data processing apparatus in accordance preferred embodiments of the present invention. The algorithm is executed for each host computer at each process. The algorithm corresponds to a detail version of step 612 in FIG. 6 or step 621 in FIG. 7. Reference numerals 627-633 denote steps.

In step 627, the printer determines whether the reply information sent from the host computer contains "true". If the answer to the determination in step 627 is no, the printer then determines that a predetermined process in a predetermined host computer is in suspension.

If the answer to the determination in step 627 is yes, the printer determines in step 628 whether process idle time 705 is equal to or larger than a predetermined value. If the answer to the determination in step 628 is yes, the algorithm proceeds to step 633; otherwise, the algorithm proceeds to step 629.

In step 629, the printer determines whether process load 704 is equal to or larger than a predetermined value. If the answer to the determination in step 629 is yes, the algorithm proceeds to step 633; otherwise, the algorithm proceeds to step 630.

In step 630, the printer determines whether idle time 706 is equal to or longer than a predetermined value. If the answer to the determination in step 630 is yes, the algorithm proceeds to step 633; otherwise, the algorithm proceeds to step 631.

In step 633, a recognition process is performed to recognize a predetermined process as being in suspension.

In step 631, a recognition process is performed to recognize a predetermined process as being activated.

In step 632, the printer determines whether to shift to the power saving mode, based on the shifting conditions 707 in FIG. 8A and the status of each process recognized by each host computer. Step 612 and step 621 account for the results. For example, the shifting condition 707 is that if a process load average of the plurality of host computers is equal to or lower than a predetermined value the printer 503 shifts to the power saving mode. The process loads are averaged based on process load information acquired in response to the request, and the printer shifts to the power saving mode if the calculated load average is equal to or lower than a predetermined average value.

The method of acquiring information about idle time of a target process and idle time of a target host computer is not limited to any particular one. For example, the printer remotely calls a function of measuring process idle time of a target host computer (such as ps or gnu top of UNIX) to receive status information. If the host computer has no such functions, the printer may perform a remote call at relatively short intervals to gain host status information to sample the status of the host computer. The printer then temporarily stores the host status in a working area in the memory thereof, and calculates idle time using the timer arranged therewithin.

The combination and order of steps shown in FIG. 9 may be changed as appropriate. For example, steps 628 and 628 may be reversed in the order thereof, or step 629 may be omitted entirely.

Returning to FIG. 6, the controller 402 shifts to the power saving mode if the determination in step 612 results in the shift to the power saving mode. The controller 402 then stores a variety of parameters required to shift back from the power saving mode (step 613).

Since the DRAM 404 consumes considerably power for the characteristic thereof in this preferred embodiment, a function to cut off power to the DRAM 404 is provided. A variety of data, which is required when the printer is restored back from the power saving mode, is evacuated to a non-volatile memory (not shown).

For example, the data may be evacuated to the EEPROM in the DRAM 404 through the memory controller 403 or another storage medium such as a hard disk although not shown in FIG. 2.

The controller 402 shifts to a sleep mode as the power saving mode (step 614).

The present invention is not limited to a particular sleep mode. For example, the DRAM 404 is shifted to a self refresh mode, and the supply of clocks to other blocks including the memory controller 403, the rasterizer 406, the DMA unit 407, the engine I/F 408, and even the controller 402 may be cut off. The printer engine 409 may cut off the supply of power to a fixing unit and other power consuming units therewithin.

To achieve power saving, no particular limitation is set on how many and what blocks are set into the power saving mode. The present invention is not limited to any particular power saving method. Any power saving method is acceptable as long as the method includes a process for shifting back from the sleep mode and a process for assuring power to enable sampling the status of the host computer over the network to shift back from the sleep mode.

If the power saving mode is achieved with the DRAM 404 shifted to the self refresh mode and keeping the data stored, the content of the parameters stored in step 613 remains small. Response speed to shift back from the power saving mode is faster than the case in which a great deal of data is evacuated to the non-volatile memory to power off the DRAM 404. However, no large power saving efficiency is expected compared with the case in power to the DRAM 404 is cut off.

At any rate, a section performing a restoration process must be kept alive. In this preferred embodiment, the interface unit 401 serves as the restoring section. The controller 402 is thus restored in response to an interrupt from the interface unit 401.

The interface unit 401 is intelligent to some degree, for example, interprets and responds to a protocol stack. If a power saving operation is activated in an unattended office during midnight, for example, the printer repeats steps 614 through 621.

The printer monitors data coming in from the network during the saving operation in the sleep mode (step 615). The printer determines whether the input data is print data or power-up command. If the input data is determined to be the print data or the power-up command, the algorithm proceeds to step 623 to restore the printer to the standard printing mode from the sleep mode. If the input data is not the print data or the power-up command, the algorithm proceeds to step 616. When the print data is input in step 615, the printer is restored from the power saving mode to the standard printing mode even if the printer has been in the power saving mode.

If the print data is not input in step 615, the printer determines in step 616 whether a timeout value of 5 minutes has elapsed since last broadcast access to the host computers. The timeout value of 5 minutes is used in step 606 and set by the user as the host sampling interval value (5 minutes in this preferred embodiment). If the printer determines that the timeout value of 5 minutes has not elapsed yet, the algorithm loops to step 615; otherwise, the algorithm proceeds to step 617.

The present invention is not limited to the timeout value of 5 minutes. The timeout value, namely, the host sampling interval value, used in step 606 may be set to be different from the timeout value set in step 616 as shown in FIG. 8B.

If it is determined in step 616 that the host sampling interval value of 5 minutes has elapsed, the printer makes a broadcast access to the host computers over the network to recognize the start-up of the host computers as in step 608.

A target host computer is identified in step 618 as in step 609.

In step 619, requests are placed as in step 610. For example, the printer A listed in FIG. 8A places a request to a host computer A through the access route 1401 to query whether a process called X is activated on the host computer A (step 619).

In step 620, reply information from each host computer is acquired in response to the request made in step 619, as in step 611.

In the same determination method performed in step 612, the printer determines whether to continue the sleep mode as the power saving mode (step 621). The printer maintains the power saving mode if the conditions shown in FIG. 8A are satisfied, a process to maintain the power saving mode is performed; otherwise, a process to shift back from the power saving mode is performed. The process in step 621, identical to the process in step 612, is performed as detailed in the flow diagram illustrated in FIG. 9.

If the determination to continue the power saving mode is performed, the algorithm proceeds to step 622. If the determination to shift to the standard printing mode back from the power saving mode is performed, the algorithm proceeds to step 625.

If it is determined in step 621 that no mode shift is to be performed, the printer checks in step 622 whether another condition is present as in step 612. According to the determination criteria shown in FIG. 8A, the answer to the determination in step 622 is no in the printer A because the condition 2 is present subsequent to the determination of the process state according to the condition 1. The answer to the determination in step 622 is yes after the process in step 612 is performed on both the condition 1 and the condition 2.

If it is determined in step 622 that there is no further condition, in other words, if a scan operation to the host computers is completed, the algorithm returns to step 615 to receive and sample print data. If it is determined that the scan operation is not yet completed, the algorithm returns to step 618 where a next scan operation is performed to a host computer of the next condition.

If it is determined in step 622 that the scan operation is not yet completed, the algorithm loops to step 618 in the same way the algorithm proceeds to step 609 when the answer to the determination in step 607 is no.

This loop allows all mode shifting conditions set beforehand to be examined.

If a series of examination Jobs reveals that the mode shifting conditions are not satisfied, the algorithm loops to step 615. Through steps 615 through 622, the same examination job is performed at the next sampling time.

Throughout the series of examination jobs, the printer stays on the sleep mode, namely, on the power saving mode. The power saving operation may be repeated in an office when no body is working during night time, for example. Even if the user goes home with application software left running, the determination process illustrated in FIG. 8A is performed based on the checking of the load average of the application (process). Power saving mode more efficient than ever before is achieved.

If the printer determines in step 615 that the print data has been received, the printer shifts to the standard printing operation. The controller 402 restores, to the standard printing mode, the rasterizer 406, the memory controller 403, the DRAM 404, the DMA unit 407, the engine I/F 408, the compressor/expander 405, etc. The printer engine 409 is also restored to the standard printing mode (from the sleep mode) (step 623).

The printer reverses the shifting operation to the sleep mode performed in step 614. The supply of clocks and power to each block resumes. The printer engine 409 allows the fixing unit to be heated to the fixing status thereof, and performs a calibration operation to be ready for an electrophotographic process.

Subsequent to the restoration from the sleep mode in step 623, the required parameters (parameters immediately prior to the sleep mode) evacuated to the non-volatile memory in step 616 are loaded back to the DRAM 404 (step 624). The algorithm then loops to step 605.

Converse to step 616, the data, evacuated into the hard disk or the non-volatile EEPROM in step 616, is loaded to the DRAM 404. Through steps 623 and 624, the state prior to step 616, namely, the print ready state, is restored. Since the print data has been received, the algorithm loops to step 605 to perform the printing operation.

If it is determined in step 621 that the mode shifting is performed, for example, if the condition that an application X is running on a host computer A holds, the printer is restored from the sleep mode in the same manner as in steps 623 and 624 (step 625). The parameters are loaded to the DRAM 404 (step 626), and the print ready state resumes.

Since no print data has yet been received subsequent to the restoration, the algorithm loops to step 604 and remains on standby waiting for the arrival of the print data.

In the restoration from step 624 to step 605, the printer shifts into a print ready state after automatically detecting a pre-process of the actual printing operation started by the user. This arrangement minimizes waiting time of the user after the printer enters the printing operation. In the restoration from step 626 to step 604, the user waits by startup time of the printer until the actual printing operation starts.

A network printing system thus constructed has a power saving feature and causes no stress on the user in operation.

In accordance with the first preferred embodiment, the printer recognizes the state of the host computer. A power saving environment is established in response to the recognized state. Even in an environment where a plurality of host computers are connected to a network, an optimum power saving environment is organized accounting for the state of each host computer.

Since target host computers are registered in the memory of each printer, host computers of interest may be limited. The workload on the printer is thus reduced. If individuals using a predetermined printer are limited to particular members, power saving control is efficiently performed. An optimum power saving control is performed on each printer. In a network environment containing a plurality of printers, an appropriate power saving control is performed as a whole.

Second Embodiment

As already discussed in connection with the first embodiment, the host computer name and the application name (process name) are designated as the shifting conditions. The present invention is not limited to these items. A MAC address or DNS may serve as the host computer name as long as the host computer is identified thereby. The host computer may be identified using any known service.

The printer requests the nearby host computers to send information concerning process (information shown in FIG. 8A) in steps 607-612 in FIG. 6 and in steps 622-632 in FIG. 7. The present invention is not limited to this arrangement. Alternatively, the host computer may send the information containing process information to the printer as event information. In this arrangement, a printer as a destination and a condition for issuing an event must be registered in the host computer. The condition for issuing the event for example may be satisfied, for example, if a predetermined time has elapsed, or if a process status has changed.

Rather than identifying the application, shifting between an active power mode and a power saving mode may be determined based on the load average of the host computer on a local subdomain because host computers in a local domain (having the same sub domains) over the network may be identified from the IP addresses.

The host computer is shifted to the power saving mode such as the sleep mode in an unattended office, for example. The printer then periodically samples the workload on a CPU of the host computer to calculate the load average. This value must be very low. The user sets the load average as a threshold in the printer, and the printer then is shifted to the power saving mode at the moment the host computer is lowered below the set threshold.

The first preferred embodiment has been discussed on the assumption that the user sets the mode shifting conditions. The present invention is not limited to any particular setting method, any particular user, and setting timing. For example, any user who uses the printer may set personal user information as conditions in FIG. 8A. The user may set a mode shift in the printer through a WEB based interface, and the printer holds requests having setting values falling within a storage capacity to provide service.

Under a network environment, the user has a unique user name in the local domain. Rather than identifying the host computer, the printer performs a process scan to the host computers powered on. If a set application and a set user name correspond to those in any of the host computers, that computer is determined as a target host computer. More specifically, if each block is designed to set the mode shifting condition that a user C uses a software program X, the printer requests host computers powered on to send a reply to a query of whether or not there is an X application process used by the user C. If the reply is true, the printer does not shift to the sleep mode, or is restored from the sleep mode.

The algorithm determining the process state is not limited to any particular one. For example, the process state is determined based on whether the average of several sample values is above a set value. On the other hand, if power saving host computers are widely available, any host computer, which is connected to the other end of the network, may happen to be in the power saving mode. In this case, the status that the user does not use the host computer is directly exchanged with the printer. The printer thus determines based on the status information whether or not to shift to the sleep mode.

Third Embodiment

Figure 10:
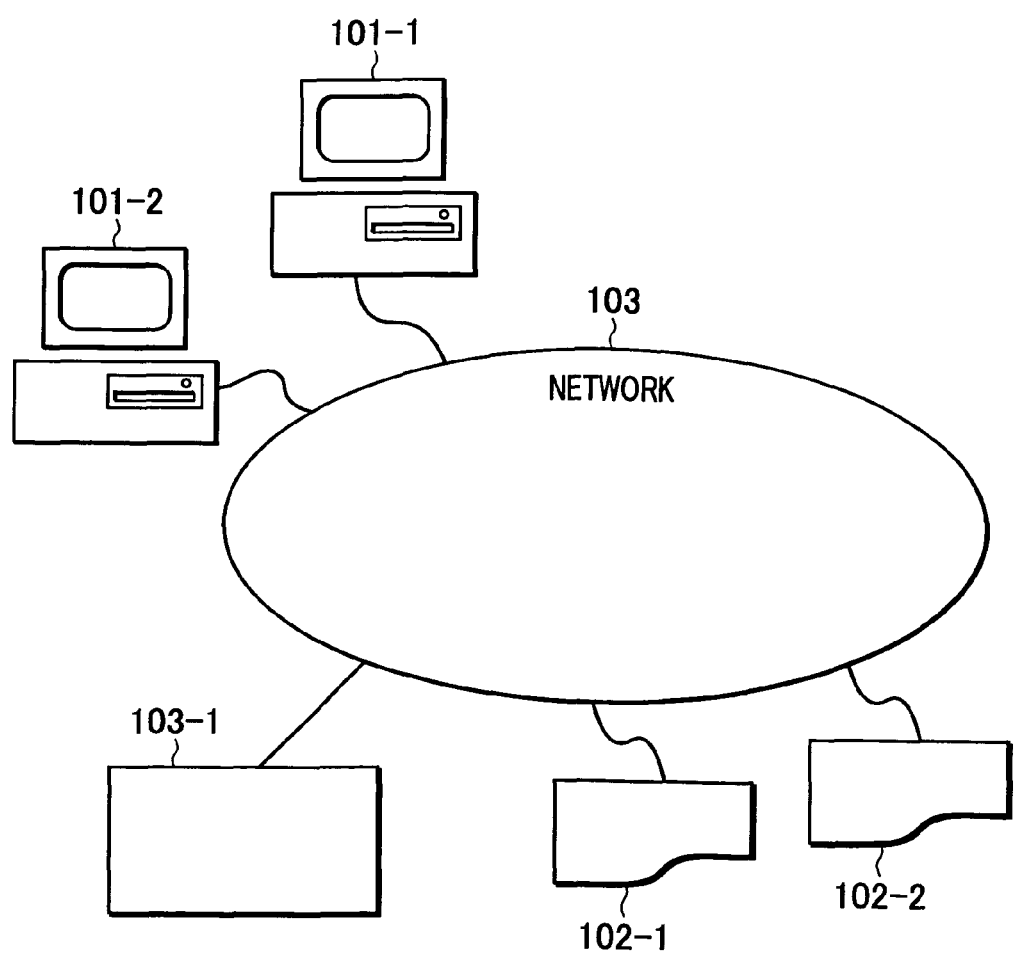
FIG. 10 illustrates a printing system incorporating the data processing apparatus of preferred embodiments of the present invention.

The controller 311 performs power control by determining whether or not to shift to between the power saving mode and active power mode. A third embodiment is not limited to this manner. The power control determination is performed by an information processing apparatus. The information processing apparatus (denoted 103-1 in FIG. 10) is a print server, for example.

Together with a printer and a host computer, the information processing apparatus 103-1 performs processes illustrated in the flow diagrams in FIGS. 6, 7 and 9 and described in connection with the first and second embodiments.

The difference of the third embodiment from the first and second embodiments is discussed in detail here. If the answer to the determination in step 612 is yes, the information processing apparatus (corresponding to the server 103-1 in FIG. 10) sends, through a network (corresponding to a network 103 shown in FIG. 10), a command to shift to the power saving mode to a printer identified in response to the request placed in step 610. The printer, which has received the sent command through an I/F unit 401 shown in FIG. 2, analyzes the content of the command at the controller 311 while shifting to the power saving mode in response to the received command.

If it is determined in step 621 shown in FIG. 7 that the printer is to be restored from the power saving mode, the information processing apparatus sends a command to shift back from the power saving mode to the printer, which is identified in response to the request in step 619 in FIG. 7. The printer, which has received the sent command through an I/F unit 401 shown in FIG. 2, analyzes the content of the command at the controller 311 while shifting back from the power saving mode in response to the received command and entering a warm-up state.

Each printer manages devices registered therewithin in the first and second preferred embodiments. In accordance with the third preferred embodiment, the information processing apparatus generally manages list information listing host computers compatible with a plurality of printers and a variety of parameters (701-708). The information processing apparatus thus performs power control management in accordance with management information containing setting and registration of the printers.

Power control of the printer itself to shift between the active and power saving modes is similar to the one already discussed in connection with the first and second preferred embodiments, and the discussion thereof is omitted here.

The process information of the host computer is acquired in the first and second preferred embodiment. The present invention is not limited to this arrangement. For example, the process information of devices including printers may also be acquired. In this case, however, the printer is provided with a function to respond to a request. The printer performs the processes illustrated in FIGS. 6, 7, and 9 together with devices including printers and host computers.

In accordance with the third preferred embodiment, the information processing apparatus such as the print server manages power based on the process information that may be different from host computer to host computer.

Since the information processing apparatus generally manages power, the workload on each printer involved in power management is reduced. The operation of the printer to shift to and back from power saving mode accounts for the process information and device information of a variety of devices.

In accordance with the first through third preferred embodiments, the shifting operation to an appropriate power saving mode is activated based on the status of the process (the process name 702 shown in FIG. 8) of each device. The load average of the process and the workload on the CPU show that a predetermined process consumes power of a certain level or more. Then, it is determined that an application software program (corresponding to the process) is currently operated by the user. Conversely, if the load average is less than a certain level, it is determined that the application software program is currently inoperative. From these determinations, the shifting operation to the power saving mode is performed.

Whether to shift to the power saving mode may be set in the shifting condition 707 accounting for the detailed process states of a plurality of devices. Power control is flexibly performed in accordance with an office environment and applications of printers. The office environment and the applications of the printers may be different from user to user. For example, in a network environment where devices remain powered on 24 hours a day, the power saving mode is activated if the detailed process information of the devices shows a low load. Since the types of processes are designated, a particular process may be excluded from the tables in FIG. 8A under an environment where that particular process is constantly in progress at the full capacity thereof. A flexible power saving environment is thus provided.

The present invention is not limited to the above preferred embodiments. Various modifications of the present invention are possible, and such various modifications fall within the scope of the present invention.

A data processing program readable by the data processing apparatus of the preferred embodiments of the present invention will now discussed with reference to a memory map shown in FIG. 11.

FIG. 11 illustrates the memory map of a storage medium storing a variety of data processing programs readable by the data processing apparatus of the preferred embodiments of the present invention.

Information managing a group of programs stored in the storage medium, such as version information and producer information, although not shown, may be also stored. Furthermore, information dependent on a program reading side OS, such as an icon identifying a program, may also be stored.

Data attached to each program is also managed in the directory. A program for installing a variety of programs onto a computer may also be stored. If a program to be installed is compressed, a decompression program may also be stored.

The functions illustrated in FIGS. 6, 7, and 9 may be executed by a host computer under the control of a program installed from the outside into the host computer. A group of pieces of information including the program is supplied to an output device from a storage medium such as a CD-ROM, a flash memory, an FD, or through a network from an outside storage medium. Such an arrangement falls within the scope of the present invention.

A storage medium storing program codes of the software program performing the functions of the above-referenced preferred embodiments of the present invention is installed in a system or an apparatus, and a computer (CPU or MPU) of the system or the apparatus reads and executes the program codes stored in the storage medium. Such embodiments fall within the scope of the present invention.

The program codes read from the storage medium perform the functions of the present invention, and the storage medium storing the program codes falls within the scope of the present invention.

Available as storage media for supplying the program codes are a flexible disk, a hard disk, an optical disk, a magnetooptical disk, a CD-ROM, a CD-R, a magnetic tape, a nonvolatile memory card, ROM, EEPROM and the like.

By executing the program codes read by the computer, the functions of the preferred embodiments are performed. Furthermore, the functions of the above-referenced preferred embodiments are performed in cooperation with the OS (operating system) running on the computer or another application software program according to the instruction of the program code. Such program codes fall within the scope of the present invention.

The program codes from the storage medium are read into a memory incorporated in a feature expansion board in the computer or in a feature expansion unit connected to the computer. The CPU mounted on the feature expansion board or the feature expansion unit performs partly or entirely the actual process in response to the instruction from the program codes. The functions of the above embodiment are executed through the process. Such program codes fall within the scope of the present invention.

The decision to shift to the power saving mode may be made referencing the statuses of a plurality of processes in a single host computer based on a plurality of process attributes (spread sheet, word processing, etc.) and history thereof.

A status of a host computer is recognized and an optimum power saving environment is formed based on the result of recognition of the host computer status by examining a process of the host computer which communicates with a data processing apparatus and by controlling the supplying of power to each block for image forming in the data processing apparatus wherein the optimum power saving environment accounts for the status of each of devices connected to a network.

While the present invention has been described with reference to what are presently considered to be the preferred embodiments, it is to be understood that the invention is not limited to the disclosed embodiments. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A data processing apparatus for communicating with a plurality of information processing apparatuses through a network and for controlling an image forming apparatus, the data processing apparatus comprising:

a storing unit that stores a condition for transitioning a state of supplying power of a power source unit to each device in the image forming apparatus;

a requesting unit that requests each of the plurality of information processing apparatuses on the network to provide at least information about application software that is running on each of the plurality of information processing apparatuses;

an examining unit that examines that specific application software that has a specific process name is running on each of the plurality of information processing apparatuses based on the information provided from the respective information processing apparatuses through the network, the specific application software being capable of issuing a print job to the image forming apparatus; and a power control unit that controls the state of supplying power of the power source unit to each device in the image forming apparatus based on a number of the information processing apparatus on which the specific application software is running and the condition stored by the storing unit.

2. A data processing apparatus according to claim 1, wherein the examining unit examines the application software in accordance with user-defined parameters.

3. A data processing apparatus according to claim 2, wherein the user-defined parameters include whether the application software is active.

4. A data processing apparatus according to claim 1,
wherein the examining unit examines a load average of the application software, and
wherein the power control unit controls the power supply state based on the results of the examination of the load average.

5. A data processing apparatus according to claim 2, wherein the user-defined parameters are set on a per examination processing apparatus basis.

6. A data processing apparatus according to claim 1, wherein the power control unit limits the power supply state to each device from the power supply unit to shift to a sleep mode based on the results of examination of a plurality of application software provided by the examining unit.

7. A data processing apparatus according to claim 1, wherein the data processing apparatus is included in the image forming apparatus.

8. A power control method for a data processing apparatus including, a power source unit for supplying power required to form images, for communicating with a plurality of information processing apparatuses through a network and for controlling an image forming apparatus, the power control method comprising the steps of:

requesting each of the plurality of information processing apparatuses on the network to provide at least information about application software that is running on each of the plurality of information processing apparatuses;

examining that specific application software that has a specific process name is running on each of the plurality of information processing apparatuses based on the information provided from the respective information processing apparatuses through the network, the specific application software being capable of issuing a print job to the image forming apparatus; and controlling a state of supplying power of the power source unit to each device in the image forming apparatus based on a number of the information processing apparatus on which the specific application software is running and a condition for transitioning the state of supplying power of the power source unit to each device.

9. A power control method according to claim 8, wherein the examining step includes examining the application software in accordance with user-defined parameters.

10. A power control method according to claim 9, wherein the user-defined parameters include whether the application software is active.

11. A power control method according to claim 8,
wherein the examining step comprises examining a load average of the application software, and
wherein the power control step comprises controlling the power supply state based on the results of the examination of the load average.

12. A power control method according to claim 9, wherein the user-defined parameters are set on a per examination processing apparatus basis.

13. A power control method according to claim 8, wherein the power control step comprises limiting the power supply state to each device from the power supply unit to shift to a sleep mode based on the results of examination of a plurality of application software provided in the examining step.

14. A power control method according to claim 8, wherein the data processing apparatus is included in the image forming apparatus.

15. A storage medium storing, in a computer readable form, a computer program of a data processing apparatus including, a power source unit for supplying power required to form images, for communicating with a plurality of information processing apparatuses through a network and for controlling an image forming apparatus, the computer program comprising:

program code for executing the steps of requesting each of the plurality of information processing apparatuses on the network to provide at least information about application software that is running on each of the plurality of information processing apparatuses;

program code for executing the steps of examining that specific application software that has a specific process name is running on each of the plurality of information processing apparatuses based on the information provided from the respective information processing apparatuses through the network, the specific application software being capable of issuing a print job to the image forming apparatus; and program code for controlling a state of supplying power of the power source unit to each device in the image forming apparatus based on a number of the information processing apparatus on which the specific application software is running and a condition for transitioning the state of supplying power of the power source unit to each device.

16. A data processing apparatus according to claim 1, wherein the power control unit controls such that the power of the power source unit to each device in the image forming apparatus in a case that the information processing apparatus on which the specific application software is running does not exist is lower than one in the case that the information processing apparatus on which the specific application software is running exists.

17. A power control method according to claim 8, wherein the controlling step includes controlling such that the power of the power source unit to each device in the image forming apparatus in a case that the information processing apparatus on which the specific application software is running does not exist is lower than one in the case that the information processing apparatus on which the specific application software is running exists.

18. A storage medium according to claim 15, wherein the program code for controlling includes program code for controlling such that the power of the power source unit to each device in the image forming apparatus in a case that the information processing apparatus on which the specific application software is running does not exist is lower than one in the case that the information processing apparatus on which the specific application software is running exists.

* * * * *